United States Patent [19]
Scott et al.

[11] 3,754,119
[45] Aug. 21, 1973

[54] LUNCH TICKET TABULATING MECHANISM

[75] Inventors: Edward E. Scott, Emporia; Maurice David Sullivan, Cheney, both of Kans.

[73] Assignee: Edward E. Scott, Emporia, Kans.

[22] Filed: Jan. 7, 1972

[21] Appl. No.: 216,072

[52] U.S. Cl. .................. 235/61.6 R, 235/61.12 N
[51] Int. Cl. ...................... G06k 15/00, G06k 19/00
[58] Field of Search ............ 235/61.12 R, 61.12 N, 235/61.12 M, 61.6 R, 61.9 R, 61.1, 61.11 E, 61.11 R, 61.11 D, 61.7 B; 101/93 C; 340/149 A

[56] References Cited
UNITED STATES PATENTS

| 3,482,082 | 12/1969 | Isreeli | 235/61.12 R |
|---|---|---|---|
| 2,968,521 | 1/1961 | Gross | 235/61.12 R |
| 3,266,298 | 8/1966 | Whitehead et al. | 235/61.12 R |
| 3,356,021 | 12/1967 | May et al. | 235/61.12 R |
| 3,526,562 | 9/1970 | Dahl, Jr. | 235/61.12 R |
| 3,553,440 | 1/1971 | Dale | 235/61.12 R |

*Primary Examiner*—Daryl W. Cook
*Attorney*—Schmidt, Johnson, Hovey & Williams

[57] ABSTRACT

A tabulating and cancelling machine reads information from a data card inserted into the machine, stores the information for periodic display, and severs one credit portion from the card to cancel such portion each time the card is inserted into the machine, until all of the credit portions of the card have been severed therefrom. Data stripes on the card present a code representation of a specific factual situation, and each stripe is printed on all of the credit portions of the card such that, by placing an identification number of the card holder on each credit portion, the severed credit portions may be retained and used for audit purposes.

20 Claims, 8 Drawing Figures

Patented Aug. 21, 1973

LUNCH TICKET TABULATING MECHANISM

This invention relates to a machine for tabulating information contained on a data card or ticket inserted in the machine, and for cancelling successive credit portions of the ticket by severing one of such portions from the ticket each time the latter is inserted in the machine.

The federal government administers a subsidy program which is designed to insure that all school children who desire to receive a hot lunch at school are able to do so regardless of their respective family's financial situation. To this end, the program calls for a subsidy in the form of a free lunch or various amounts of deductions from the full price of a lunch, depending upon the need of the child as measured by the economic status of his family. The program also stipulates, however, that there shall be no physical separation of, or discrimination against, any child because of his inability to pay the full price of lunches and, further, that there will be no overt means of identifying such children and their respective amounts of price deduction.

Present methods of implementing this program have been largely unsatifsactory, primarily because of the strict regulation regarding outwardly visible signs of subsidy which has raised administrative costs and greatly increased the amount of time needed to complete preliminary record-keeping steps before the children have lunch. In some instances it has been necessary to hire special personnel to carry out the record-keeping process, while in other situations teachers have been required to use their valuable class time each day to perform this function.

Acordingly, the goal of the present invention is to provide a novel system having a wide range of possible uses but which is particularly adapted for implementing the above-mentioned lunch program in a manner which eliminates, or at least substantially reduces the high cost and time-consumption problems associated with present implementation methods, while at the same time operating well within the strict guidelines of the program regarding public disclosure of the participating child's economic status.

More specifically, it is an important object of the instant invention to provide a novel ticket for use as a lunch ticket or the like with coded data thereon indicating, for example, the amount of lunch price deduction allocated to the ticket holder, and a combined tabulating and cancelling machine for rapidly processing such tickets which senses and records the information presented by the coded data of a ticket each time the ticket is inserted into the machine and which, during the same insertion, also cancels credit for a deduction by severing a portion of the ticket representing such credit from the remainder of the ticket.

An additional important object is to provide a machine as aforesaid which is capable of recognizing each of a number of different categories of information presented by the code data of tickets introduced to the machine, such categories being, for example, various amounts of deduction from the normal price of a lunch, tabulating the number of times each of said categories appears, and displaying the resulting count of any category selected for display.

A further important object of the invention is to provide a ticket wherein coded categories of information are denoted by arrangements of data stripes on the ticket to prevent public recognition of the type of deduction allocated to the ticket holder, there being a distinct arrangement of stripes for each category differing from the arrangements of all the other categories.

In addition to using code stripes as a means of concealing factual information, such as the deduction category attributed to the ticke holder, another important object of the present invention is the provision of several series of different stripe arrangements for each type of deduction category, all having the same meaning such that different tickets representing the same amount of deduction may not necessarily have identical stripe arrangements, thereby rendering the code presented by the stripes virtually undecipherable.

Yet another important object is to provide a ticket wherein each severable portion of the ticket contains a complete set of stripes relating to a specific category and, additionally, carries the student identification number of the child holding the ticket, so that severed ticket portions may be accumulated and retained for audit purposes.

Figure 1:
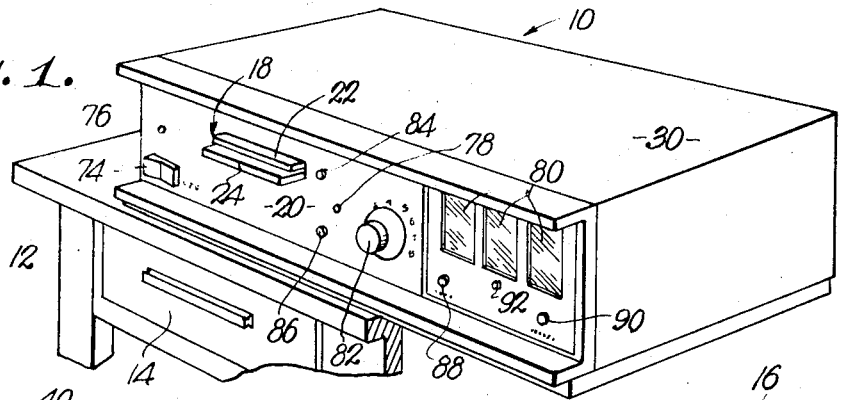
FIG. 1 is a fragmentary, perspective view of a tabulating and cancelling machine of the present invention mounted on a stand.
Figure 4:
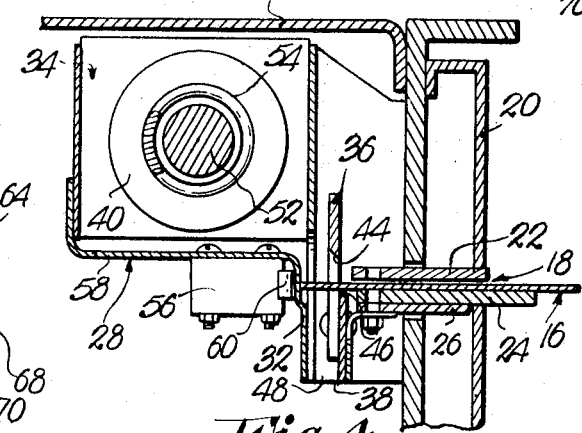
FIG. 4 is a fragmentary, cross-sectional view of the machine taken along line 4—4 of FIG. 3.
Figure 3:
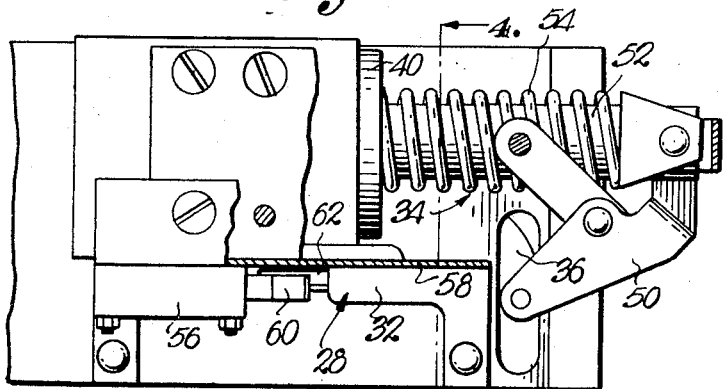
FIG. 3 is an enlarged, fragmentary, rear elevational view of the machine with the back panel removed and parts broken away for clarity.
Figure 5:
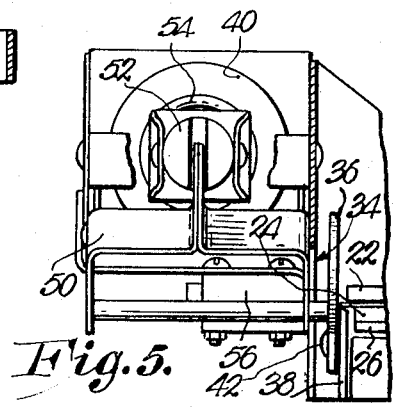
FIG. 5 is an enlarged, fragmentary, end elevational view of the cutter assembly and receiving station of the machine similar to FIG. 4.

As shown in FIG. 1, the tabulating and cancelling machine 10 is adapted to rest or be mounted upon a suitable stand 12 having a removable drawer 14 which receives and accumulates severed portions of an article such as a lunch ticket 16 (FIGS. 6 and 7) used in connection with the machine 10. A tabulating and cancelling station is defined by a ticket slot 18 in the front panel 20 of machine 10, and a pair of vertically spaced, flat guides 22 and 24 receive and support ticket 16 when the latter is placed in slot 18 as shown in FIG. 4. A sensor assembly 26 secured beneath the lower guide 24 at the inner end of the latter, functions to obtain information from ticket 16 when the latter is disposed in slot 18 in a manner which will hereinafter be described in detail.

Figure 2:
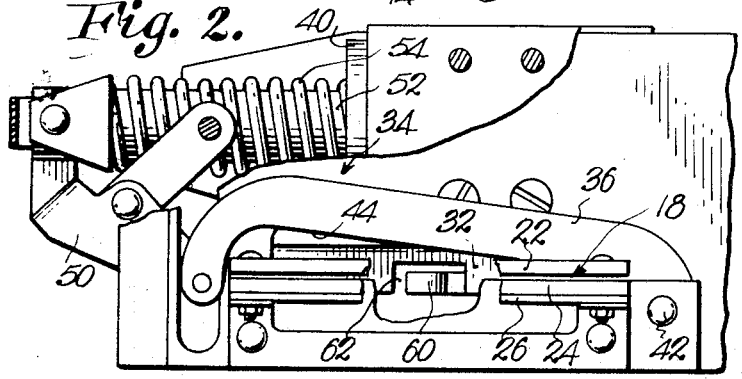
FIG. 2 is an enlarged, fragmentary, front elevational view of the machine with the front panel thereof removed and parts broken away to reveal details of construction.

A generally L-shaped bracket 28 within the cabinet 30 of machine 10 has a downturned leg 32 aligned with slot 18 as shown best in FIGS. 2 and 4 to serve as an abutment or stop for ticket 16 when the latter is inserted into slot 18. A cutter assembly 34 for severing end portions from ticket 16 includes a swingable blade 36, a stationary anvil 38, and an electrically powered solenoid device 40 for effecting operation of the blade 36. Blade 36 is pivotally supported by a pin 42 (FIG. 2) at one end thereof and has a lower shearing edge 44 which cooperates with an upper shearing edge 46 of anvil 38. As shown in FIG. 4, ticket 16 projects beyond the guides 22 and 24 between blade 36 and anvil 38 into engagement with bracket leg 32 when ticket 16 is properly located within slot 18. A vertical chute 48 directly beneath blade 36 communicates with an exit opening (not shown) in the bottom of cabinet 30 for discharging severed ticket portions into the drawer 14 of stand 12.

Linkage 50 couples the free end of cutter blade 36 with the reciprocable armature 52 of solenoid 40 to effect raising and lowering of blade 36 in response to extension and retraction of armature 52. A coiled compression spring 54 surrounding armature 52 returns the latter to its standby, extended condition after energization of solenoid 40 has been completed. A microswitch 56 secured to the horizontal leg 58 of bracket 28 is electrically coupled with the solenoid 40 and sensor assembly 26 for controlling operation thereof and has an operating leaf 60 aligned with an opening 62 (FIG. 2) in leg 32 at ticket level. Leaf 60 normally projects through opening 62 into disposition for engagement with and actuation by ticket 16 when the latter is inserted in slot 18 against leg 32.

Figure 7:
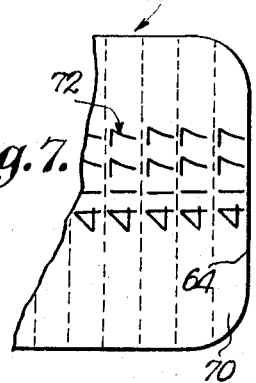
FIG. 7 is a fragmentary plan view of the opposite side of the ticket of FIG. 6.
Figure 6:
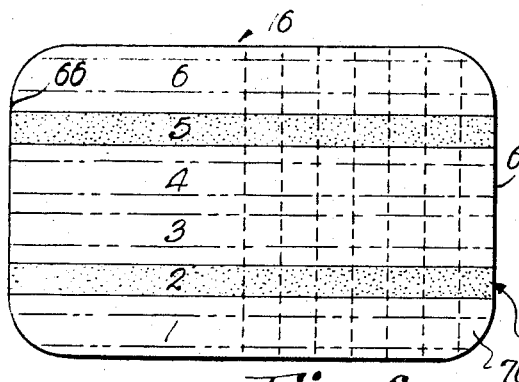
FIG. 6 is a plan view of one side of a lunch ticket designed for use with the machine of the present invention.

Referring to FIGS. 6 and 7, the ticket 16 is rectangular in configuration having a pair of opposed ends 64 and 66 and is constructed from suitable card stock such as paperboard material. One side of ticket 16, illustrated in FIG. 6, has a plurality of elongated, laterally spaced data stripes 68 which extend from end 64 of ticket 16 to the opposite end 66. A longitudinally extending series of severable credit portions 70 integral with ticket 16 extends from end 64 to a point approximately midway between ends 64 and 66, each individual portion 70 extending across ticket 16 from one edge to the opposite edge thereof. The width of each severable portion 70 is determined by the spacing between blade 36 and bracket leg 32, and the total number of portions 70 in the series is optional, with the understanding that each portion 70 represents credit for one meal.

As indicated in FIG. 6, the ticket 16 has six data stripe locations, although only two of such locations are shown as being occupied by a stripe 68. The stripes 68 may have a magnetic quality which can be sensed by appropriate mechanism within the machine 10 or, preferably, may be light-absorptive in nature against a light-reflective background. Thus, the presence or absence of a light-absorbing stripe 68 at each stripe location determines the code. It is contemplated that at least six different subsidy categories will be used to correspond to different amounts of deductions from the full price of a lunch, and by utilizing the stripe coding herein described, all of these categories may be easily handled, with the additional benefit that several different stripe arrangements may be provided for the same type of subsidy category, thus making the code presented by stripes 68 virtually undecipherable.

For purposes of description, stripes 68 are numbered 1 through 6 as shown in FIG. 6. The first, third and fourth stripes represent a binary coded decimal representation of numbers 1–6, depending upon which one of the six types of tickets 16 corresponding to the six subsidy categories is inserted into machine 10. The second and fifth stripes are dummy stripes. Thus, by printing one or the other of the dummy stripes, both of the dummy stripes, or neither of the dummy stripes, four variations of the same code can be obtained. For example, both of the dummy stripes are printed in FIG. 6 while none of the binary stripes is present. The complete absence of binary stripes could be used to signify that, for example, the child holding this type of ticket is entitled to a free lunch. Exactly the same meaning could be given to a ticket having only one of the dummy stripes without any binary stripes or neither of the dummy stripes without any binary stripes. The only stripes which actually convey a deduction meaning are the first, third and fourth stripes. Thus, the second and fifth dummy stripes may be utilized to render the code presented by the first, third and fourth stripes virtually undecipherable, thereby preventing any child other than the lunch ticket holder from learning the subsidy category delegated to such child.

The code is made even more difficult to decipher through the provision of a sixth stripe whose presence or absence determines whether or not the first, third and fourth stripes shall be printed inversely. For example, when the sixth inverse stripe is not printed, printing of the first binary stripe may signify a 10 cent deduction from the full lunch price. On the other hand, when the sixth inverse stripe is printed, the inverse is true, with printing of the third and fourth stripes signifying the same 10 cent deduction. Thus, by combining the use of the sixth inverse stripe with the second and fifth dummy stripes, it may be seen that four additional variations of the same binary code representation may be obtained, thereby increasing the total number of variations for each code representation of a deduction or subsidy category to eight.

The opposite side of ticket 16, illustrated in FIG. 7, carries indicia 72 identifying the child who owns the particular ticket. This may be most easily carried out by placing the child's student identification number on each of the severable portions 70 as shown. Thus, each severable portion 70 carries a complete set of code stripes 68 on one side thereof and the student identification indicia 72 on the opposite side thereof.

In use, it is contemplated that a cashier be stationed at machine 10 to receive and process lunch tickets from children in line. Referring to FIG. 1, a power switch 74 on panel 20 activates the components of machine 10, which activated condition is indicated by a small lamp 76 above switch 74. When a ticket 16 is inserted into slot 18, the sensor assembly 26 instantaneously determines which of the subsidy categories is presented by the code striping on ticket 16 and causes a lamp 78 to light when the data has been completely entered. The end credit portion 70 is then quickly cancelled by severing the same from ticket 16, whereupon ticket 16 may be removed from slot 18 so that the next ticket 16 may be processed. Each ticket 16 is used until all of its credit portions 70 have been removed indicating a complete cancellation of the ticket, whereupon the child may use a new ticket 16 having a full supply of portions 70.

The number of times each subsidy category is presented by various tickets 16 is counted by machine 10 and stored for periodic readout. In this connection, three display windows 80 on panel 20 corresponding to ones, tens, and hundreds digits display a visual indication of a stored count upon command. A manual selector switch 82 determines which subsidy category count will be displayed at windows 80, there being at least six selection possibilities corresponding to the six subsidy categories contemplated by the lunch program. Two additional manual data entry switches 84 and 86 permit the tabulation of other situations not presented by ticket 16, such as milk purchases and the like. Accordingly, it is preferred that two additional selections corresponding to the manual entries be provided on selector switch 82.

The front panel 20 also carries a display testing switch 88, a memory reset switch 90, and an overflow monitor light 92. The display testing switch 88 may be used to test the display lamps (not shown) behind windows 80 when the selector switch 82 is in an "off" position, while the memory reset switch 90 may be used to clear the memory bank of machine 10 before starting a new job. When the count of a particular category approaches 999, the monitor light 92 is automatically switched on, visually warning that the maximum capacity of the counting component for that particular category is about to be exceeded, whereupon the count of each category may be displayed for recording purposes and then reset to zero with switch 90.

Figure 8:
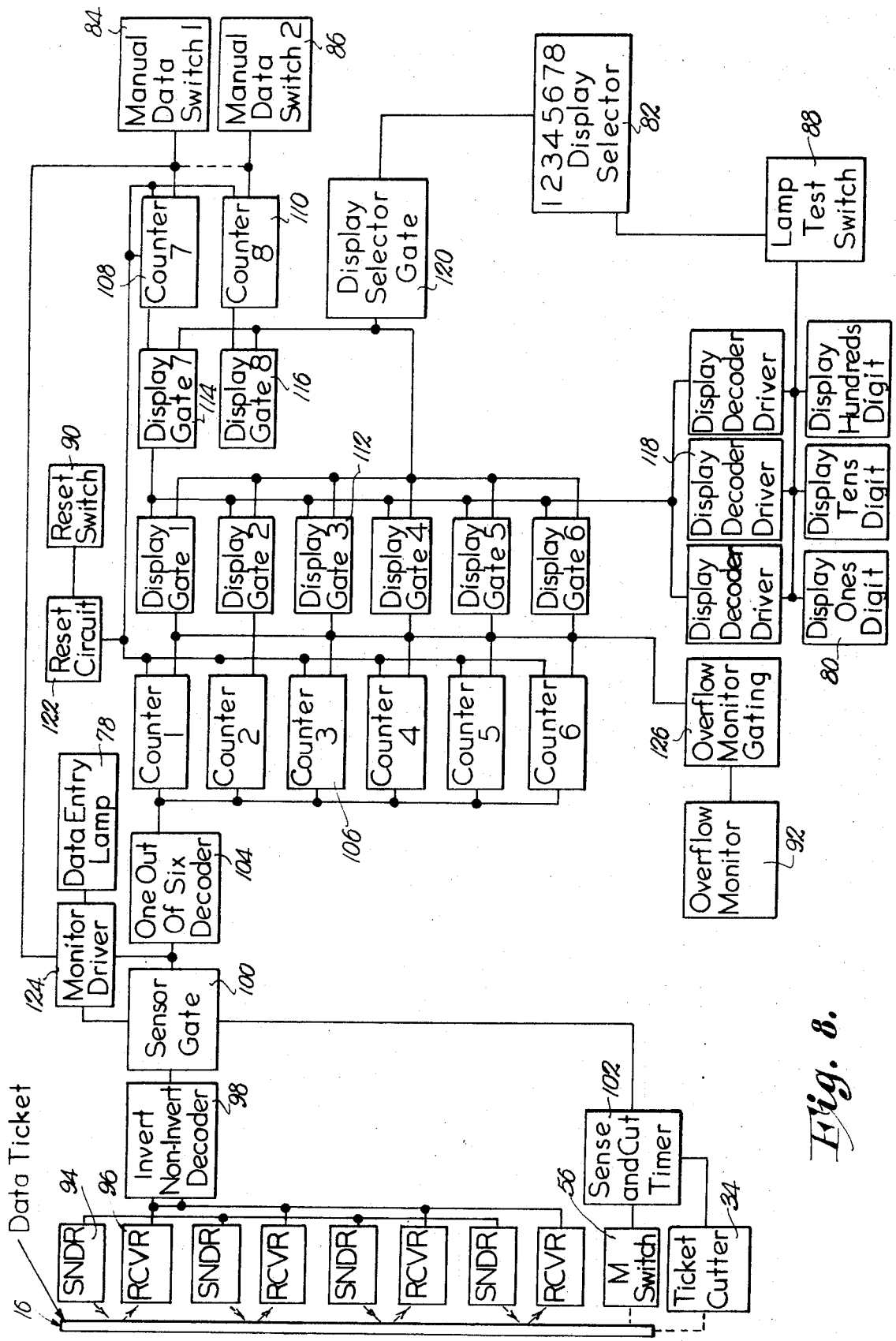
FIG. 8 is a block diagram of components of the machine for performing various sensing, cutting, counting and displaying functions.

The electronic components of machine 10 which carry out the sensing, counting and displaying functions are all commercially available units and are illustrated in their functional relationships to one another by the block diagram of FIG. 8. Beginning with the left end of the diagram, the sensor assembly 26 includes four sets of sending and receiving units 94 and 96 respectively, corresponding to the first, third, fourth and sixth stripes 68 on ticket 16. Each sensing unit 94 may be, for example, a light-emitting diode and the corresponding receiving unit 96 may be, for example, a light-sensitive phototransistor for detecting whether the light emitted by sensing unit 04 has been absorbed or reflected by the corresponding code stripe on ticket 16. The invert/non-invert decoder 98 insures that the data input from sensor assembly 26 to sensor gate 100 is always in the normal, non-inverted form regardless of whether the sixth invert stripe 68 is printed.

Before the sensor assembly 26 may be activated, the ticket-level switch 56 must be physically actuated by ticket 16, whereupon the sense-and-cut timer 102 is actuated. Timer 102 first opens sensor gate 100, allowing the code input to be applied to the one-out-of-six decoder 104 and a count to be taken by an appropriate one of the six counters 106 corresponding to the particular subsidy category presented. Timer 102 then closes the sensor gate 100 and activates the cutting assembly 34 to sever a portion 70 from ticket 16.

The manual data switches 84 and 86 are provided with corresponding manual counters 108 and 110, respectively, and the output of each of the counters 106, 108 and 110 is fed to corresponding sets of display gates 112, 114 and 116 which allow all of the counts to be fed into the display decoder drivers 118 for display windows 80. A display selector gate 120 is controlled by the selector switch 82, a reset circuit 122 is provided for reset switch 90, a monitor driver 124 is operably associated with the data entry lamp 78, and an overflow monitoring gate 126 controls the overflow monitor light 92.

It should now be apparent that use of the combined tabulating and cancelling machine 10 with tickets 16 provides an extremely expeditious and highly efficient means of implementing a nondiscriminatory lunch plan such as that set forth by the federal school lunch program described above. Moreover, it may be appreciated that the invention as hereinabove described is not limited to use in a lunch program situation even though, for purposes of clarity, machine 10 and tickets 16 have been described as being employed for this type of data processing. Manifestly, the instant invention is ideally suited for any situation wherein it is necessary to perform the combined functions of tabulation of information and cancellation of credit and, accordingly, the scope of the claims which follow is not intended to be limited to a lunch ticket as herein disclosed.

Having thus described the invention, what is claimed as new and desired to be secured by Letters Patent is:

1. In combination with an article having tabulation information thereon and a series of severable cancellation portions, a machine for tabulating said information and successively cancelling said portions of the article including:
    means defining a tabulation and cancellation station for the article;
    sensing means adjacent said station for obtaining information from the article each time the latter is placed in the station;
    means for tabulating the information obtained by said sensing means to produce a count; and
    a cutter adjacent said station for cancelling successive portions in the series by severing one of such portions from the article each time the article is placed in said station until all of the portions in the series have been severed.

2. The invention as claimed in claim 1; and
    abutment means associated with said station for locating the article with respect to said cutter when the article is disposed in the station.

3. The invention as claimed in claim 2,
    said machine being electrically powered; and
    a switch for controlling operation of said sensing means and said cutter,
    said switch being disposed for engagement with and actuation by the article when the latter is properly located in said station.

4. The invention as claimed in claim 3; and
    timing means responsive to actuation of said switch for delaying operation of said cutter until said information has been obtained by said sensing means.

5. The invention as claimed in claim 1,
    said tabulating means including means for storing said count; and
    means operably coupled with said storing means for displaying said stored count.

6. The invention as claimed in claim 5,
    there being a plurality of said articles each having information corresponding to any one of a set of predetermined factual situations,
    said storing means being operable to store a plurality of distinct counts corresponding to the number of times each of said situations is presented,
    said displaying means including means for selecting which of said counts is to be displayed.

7. The invention as claimed in claim 1; and
    a receptacle adapted to receive and accumulate severed portions from the cutter.

8. The invention as claimed in claim 1, said articles having a pair of opposed ends with said series extending from one of said ends toward the opposite of said ends, there being identical data on each of said portions; and indicia on each of said portions identifying the article.

9. The invention as claimed in claim 8, said data including a plurality of stripes at laterally spaced locations on the article, said stripes extending from said one end of the article toward the opposite end thereof across said portions in the series, the information provided by said stripes being determined by the presence or absence of a stripe at each stripe location on the article.

10. The invention as claimed in claim 9, said stripes being light-absorptive in nature set against a light-reflective background.

11. The invention as claimed in claim 9, said article having a pair of opposed, flat sides, said stripes being disposed on one of said sides and said indicia being disposed on the other of said sides.

12. In a tabulating and cancelling machine for use with a data article:

means defining a tabulation and cancellation station for the article;

sensing means adjacent said station for obtaining information from the article each time the article is placed in said station;

means for tabulating the information obtained by said sensing means to produce a count; and a cutter adjacent said station for cancelling successive portions of the article by severing one of such portions from the article each time the latter is placed in the station until all of the available portions of the article have been severed therefrom.

13. The invention as claimed in claim 12; and abutment means associated with said station for locating the article with respect to said cutter when the article is disposed in the station.

14. The invention as claimed in claim 13, said machine being electrically powered; and a switch for controlling operation of said sensing means and said cutter, said switch being disposed for engagement with and actuation by the article when the latter is properly located in said station.

15. The invention as claimed in claim 14; and timing means responsive to actuation of said switch for delaying operation of said cutter until said information has been obtained by said sensing means.

16. The invention as claimed in claim 12, said tabulating means including means for storing said count; and means operably coupled with said storing means for displaying the stored count.

17. The invention as claimed in claim 16, there being a plurality of said articles each having information corresponding to any one of a set of predetermined factual situations, said storing means being operable to store a plurality of distinct counts corresponding to the number of times each of said situations is presented, said displaying means including means for selecting which of said distinct counts is to be displayed.

18. A data article adapted for use with a tabulating and cancelling machine, said article comprising:

a card having a pair of opposed ends and a series of severable cancellation portions, said series extending from one of said ends toward the other of said ends such that the portions in said series may be cancelled by severing successive end portions from the article until said series has been depleted; and tabulation data in code form on said card adapted to provide information which may be sensed and tabulated by said machine, said data including a plurality of stripes at laterally spaced locations on the card, said stripes extending from said one end of the card toward the other end thereof across said portions in the series, the information provided by said stripes being determined by the presence or absence of a stripe at each stripe location on the card; and indicia on each of said portions identifying the article.

19. The invention as claimed in claim 18, each of said stripes being light-absorptive in nature set against a light-reflective background.

20. Th invention as claimed in claim 18, said card having a pair of opposed, flat sides, said stripes being disposed on one of said sides and said indicia being disposed on the other of said sides.

* * * * *